(12) United States Patent
Vickers (10) Patent No.: US 12,490,071 B2
(45) Date of Patent: Dec. 2, 2025

(54) CROSS-JURISDICTION EMERGENCY SERVICE PROVIDER INTERFACE

(71) Applicant: i911 International, Inc., Hallandale Beach, FL (US)

(72) Inventor: Paul Vickers, Hallandale Beach, FL (US)

(73) Assignee: i911 International, Inc, Hallandale Beach, FL (US)

( * ) Notice: Subject to any disclaimer, the term of this patent is extended or adjusted under 35 U.S.C. 154(b) by 381 days.

(21) Appl. No.: 18/109,763

(22) Filed: Feb. 14, 2023

(65) Prior Publication Data

US 2023/0267823 A1  Aug. 24, 2023

Related U.S. Application Data

(60) Provisional application No. 63/312,769, filed on Feb. 22, 2022.

(51) Int. Cl.

| | |
|---|---|
| H04W 4/90 | (2018.01) |
| G08B 25/00 | (2006.01) |
| H04M 1/72424 | (2021.01) |
| H04W 4/029 | (2018.01) |
| H04W 76/50 | (2018.01) |

(52) U.S. Cl.
CPC ............ *H04W 4/90* (2018.02); *G08B 25/006* (2013.01); *H04M 1/72424* (2021.01); *H04W 4/029* (2018.02); *H04W 76/50* (2018.02)

(58) Field of Classification Search
CPC ....... H04W 4/90; H04W 4/029; H04W 76/50; H04M 1/72424; G08B 25/006

USPC ...................................................... 455/404.1
See application file for complete search history.

(56) References Cited

U.S. PATENT DOCUMENTS

| | | |
|---|---|---|
| 7,259,656 B1 | 8/2007 | Wright |
| 8,249,549 B1 | 8/2012 | Rahman et al. |
| 8,594,866 B1 | 11/2013 | Chen et al. |
| 9,307,430 B1 | 4/2016 | Shah et al. |

(Continued)

OTHER PUBLICATIONS

International Search Report and Written Opinion, PCT Application No. PCT/US2021/043696, Nov. 12, 2021, 39 pages.

(Continued)

*Primary Examiner* — Maria El-Zoobi
(74) *Attorney, Agent, or Firm* — Fenwick & West LLP (57) ABSTRACT

An application initiates a communications session with an emergency services agency. The application determines an emergency contact services interface with an association to a first destination address corresponding to a first country in which the user device last initialized the application. The application determines, based on location data, whether the user device has entered a second country, and reprograms, in response to determination of entry into the second country, the emergency contact services interface with an association to a second destination address of an emergency services agency of the second country. Responsive to detecting selection of the emergency contact services interface, a data communication session is established with the emergency services agency of the second country, the data communication session sharing at least audio and auxiliary information with the emergency services agency of the second country.

18 Claims, 9 Drawing Sheets

(56) References Cited

U.S. PATENT DOCUMENTS

| | | | |
|---|---|---|---|
| 11,477,756 B2 | 10/2022 | Bennett | |
| 2005/0265326 A1 | 12/2005 | Laliberte | |
| 2007/0298765 A1 | 12/2007 | Dickinson et al. | |
| 2008/0037715 A1* | 2/2008 | Prozeniuk | H04M 11/04 |
| | | | 379/45 |
| 2010/0003958 A1 | 1/2010 | Ray et al. | |
| 2013/0222142 A1 | 8/2013 | Marshall | |
| 2013/0317944 A1 | 11/2013 | Huang et al. | |
| 2015/0065077 A1* | 3/2015 | Kim | H04W 4/90 |
| | | | 455/404.1 |
| 2015/0341852 A1* | 11/2015 | Knudsen | H04W 48/18 |
| | | | 455/432.1 |
| 2016/0071398 A1 | 3/2016 | Boss et al. | |
| 2016/0192166 A1 | 6/2016 | deCharms | |
| 2017/0287315 A1* | 10/2017 | Kaur | H04W 4/90 |
| 2017/0303090 A1 | 10/2017 | Stitt et al. | |
| 2018/0093637 A1 | 4/2018 | Piccioni | |
| 2018/0199179 A1* | 7/2018 | Rauner | G08B 25/10 |
| 2019/0073894 A1 | 3/2019 | Mehta et al. | |
| 2020/0014783 A1 | 1/2020 | Ojesina | |
| 2020/0082706 A1 | 3/2020 | Barber | |
| 2020/0184828 A1 | 6/2020 | Mazor et al. | |

OTHER PUBLICATIONS

International Search Report and Written Opinion, Patent Cooperation Treaty Application No. PCT/US2023/13046, Jul. 13, 2023, 29 pages.

United States Office Action, U.S. Appl. No. 18/109,767, filed May 2, 2025, 18 pages.

* cited by examiner

Medical Information

Date of Birth

01/01/1980

Gender

Male

Height

5'11"

Weight 165 pounds

Blood Type

702
determine, by an application, an emergency contact services interface with an association to a first destination address corresponding to a first country in which the user device last initialized the application

704
determining, based on location data, whether the user device has entered a second country

706
reprogramming, in response to determination of entry into the second country, the emergency contact services interface with an association to a second destination address of an emergency services agency of the second country, wherein, responsive to detecting selection of the emergency contact services interface, a data communication session is established with the emergency services agency of the second country, the data communication session sharing at least audio and auxiliary information with the emergency services agency of the second country

802
receive, by an application at a first client device, tracking data of a second client device, the tracking data of the second client device received based on a request by a user of the second client device to share the tracking data according to a parameter with the first client device

804
detect, by the application at the first client device, a selection of an emergency contact services interface

806
initiate, by the application at the first client device, a communications session with an emergency services agency having a destination address programmatically contacted based on the selection

808
transmitting, by the application at the first client device, the tracking data of the second client device to the emergency services agency

*FIG. 8*

CROSS-JURISDICTION EMERGENCY SERVICE PROVIDER INTERFACE

CROSS REFERENCE TO RELATED APPLICATIONS

This application claims the benefit of U.S. Provisional Application No. 63/312,769, filed Feb. 22, 2022, which is incorporated by reference in its entirety.

BACKGROUND

Phone numbers for contacting rescue services are not consistent across different countries. For example, while dialing 911 will reach rescue services in the United States or Canada, if one dials 911 in France, they will not reach rescue services. Phone providers may send a welcome message to client devices when those client devices reach a new country, the welcome message indicating an emergency number for that country; however, these welcome messages are quickly forgotten, and persons in distress may not remember the message exists, or may lose valuable time when in distress trying to find the message to dial the right number. In emergency situations, any loss of time in having to look up an emergency number is costly—extra seconds or minutes can mean the difference between life and death, or between serious and mild injury (e.g., from mitigating blood loss).

Moreover, even where one can contact emergency services readily, they may not be able to convey location information readily. There is no existing mechanism for, during a phone call with emergency services, sharing a location of a client device. Therefore, a person in distress is forced to try to describe their surroundings, which may be difficult. A skier lost on a ski hill may have no landmark useful to convey to emergency services, for example, that would give a clue to their location. While it might be possible to find and read GPS coordinates if a client device offers such a capability, this again would result in a loss of time in looking up that could result in a much worse outcome for a person in distress. Moreover, where a person in distress is not the one trying to reach rescue services (e.g., a person went for a midnight jog and promised a friend they would return in 30 minutes has not returned, and the friend is calling rescue services), it may be impossible to convey to rescue services where that person in distress is located.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 2 illustrates an exemplary user interface for contacting emergency services regardless of what country a user is in.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120a" indicates the text refers specifically to the element having that particular reference numeral. A reference numeral in the text without a following letter, such as "120" refers to any or all of the elements in the figures bearing that reference numeral (e.g., "120" in the text refers to reference numerals "120a" and/or "120b" in the figures). The term "real-time" in the text is used merely for convenience, and could encompass substantially real-time (i.e., within a threshold amount of time of the event occurring). The figures depict embodiments of the disclosed system (or method) for purposes of illustration only. One skilled in the art will readily recognize from the following description that alternative embodiments of the structures and methods illustrated herein may be employed without departing from the principles described herein.

Figure 1A:
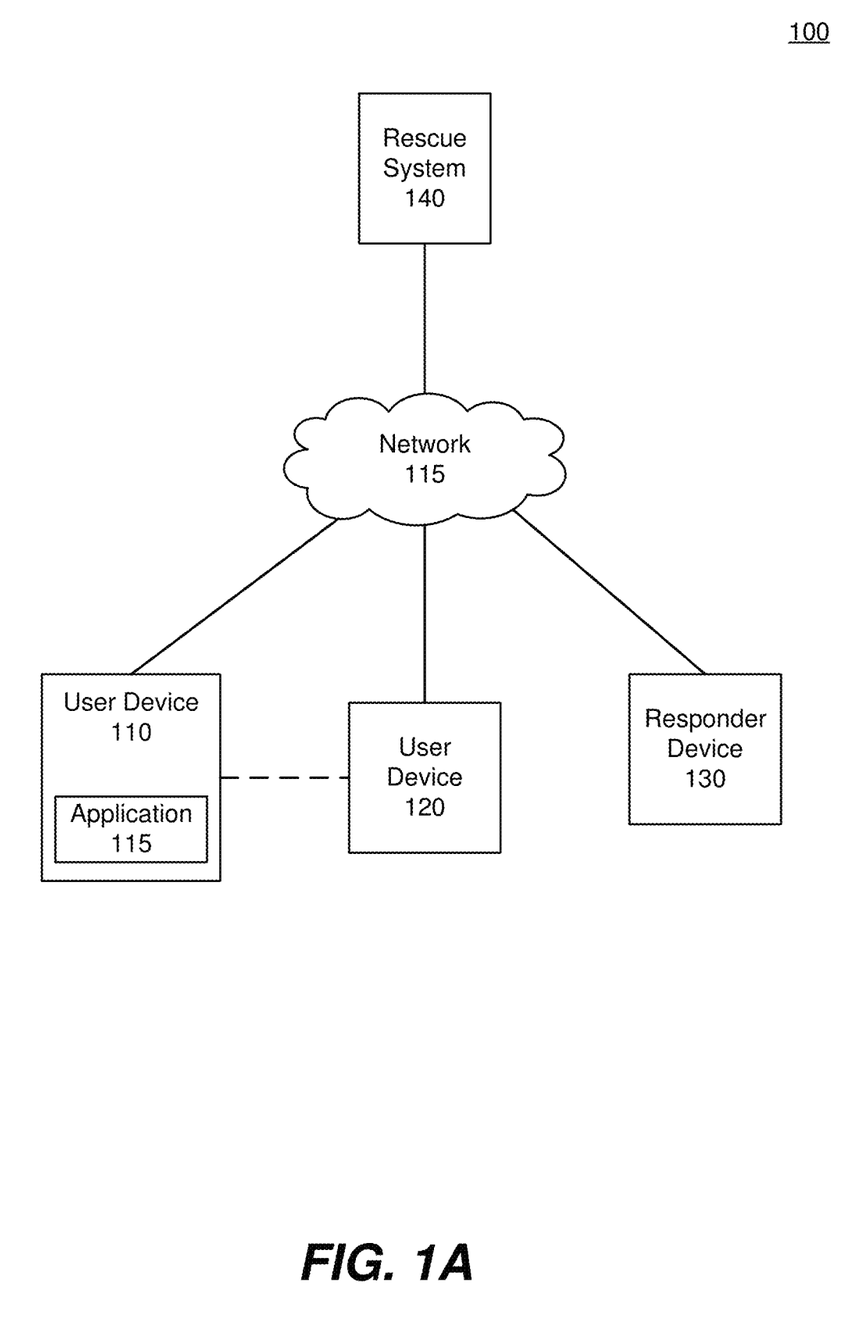
FIG. 1A illustrates one embodiment of a network environment for components of a rescue system.

FIG. 1A illustrates one embodiment of a network environment for components of a rescue system. Environment 100 includes user devices 110 and 120, network 115, responder device 130, and rescue system 140. The user devices 110 and 120 and responder device 130 may be referred to as client devices. Though there are only two user devices 120 and one responder device 130 shown in FIG. 1A, other embodiments may use a different number of client devices of either type. These various components are now described in additional detail.

User devices 110 and 120 are client devices of different users. Responder device 130 is a client device associated with a responder unit. A responder unit refers to an organized group of persons (e.g., first responders trained to respond to an emergency, such as police, firemen, paramedics, coast guard, etc.) which services a particular area (e.g., rescue district jurisdiction). The term client device refers to a computing device such as a mobile phone (e.g., cellular phone, smartphone), tablet, laptop, computer, smart watch, wearable device (e.g., fitness tracker), or any other device that can interact with the rescue system 140 over network 115 consistent with the interactions described herein for the type of the client device.

Network 115 may be any suitable communications network for data transmission. In an embodiment such as that illustrated in FIG. 1A, network 115 uses standard communications technologies and/or protocols and can include the Internet. In another embodiment, the entities use custom and/or dedicated data communications technologies. Network 115 connects user devices 110 and 120 and responder device 130 (or any number of client devices, in other embodiments) to the rescue system 140 such that the user devices 110 and 120, the responder device 130, and rescue system 140 can transmit data back and forth. Although not shown, the network 115 may also connect any other third-party device that may transmit information to the rescue system 140 which could be used by the rescue system 140 in relation to the user devices 110 and 120 and the responder device 130. For example, a third-party device may transmit user information (e.g., phone number, etc.) associated with the user of the user device 110, or additional information about the current environmental conditions surrounding the user device 110 or about location information of the user device 110 to help location estimation.

Rescue system 130 facilitates activity relating coordinating rescue services for a person in distress that is operating a user device. Further details relating to such activities are described throughout with reference to FIGS. 1B and 2-6 below. Application 115 may be installed on any client device, and may perform any functionality described herein with respect to rescue system 140 locally, or partially locally, to the client device. Likewise, any functionality described herein as performed by application 115 may partially or fully be performed by rescue system 130. As depicted, user devices may communicate via network 115, and/or may communicate on other channels (e.g., as shown by the dotted line, where a direct connection may be used such as via Bluetooth, local area network, or any other mode of communication that circumvents network 115).

Figure 1B:
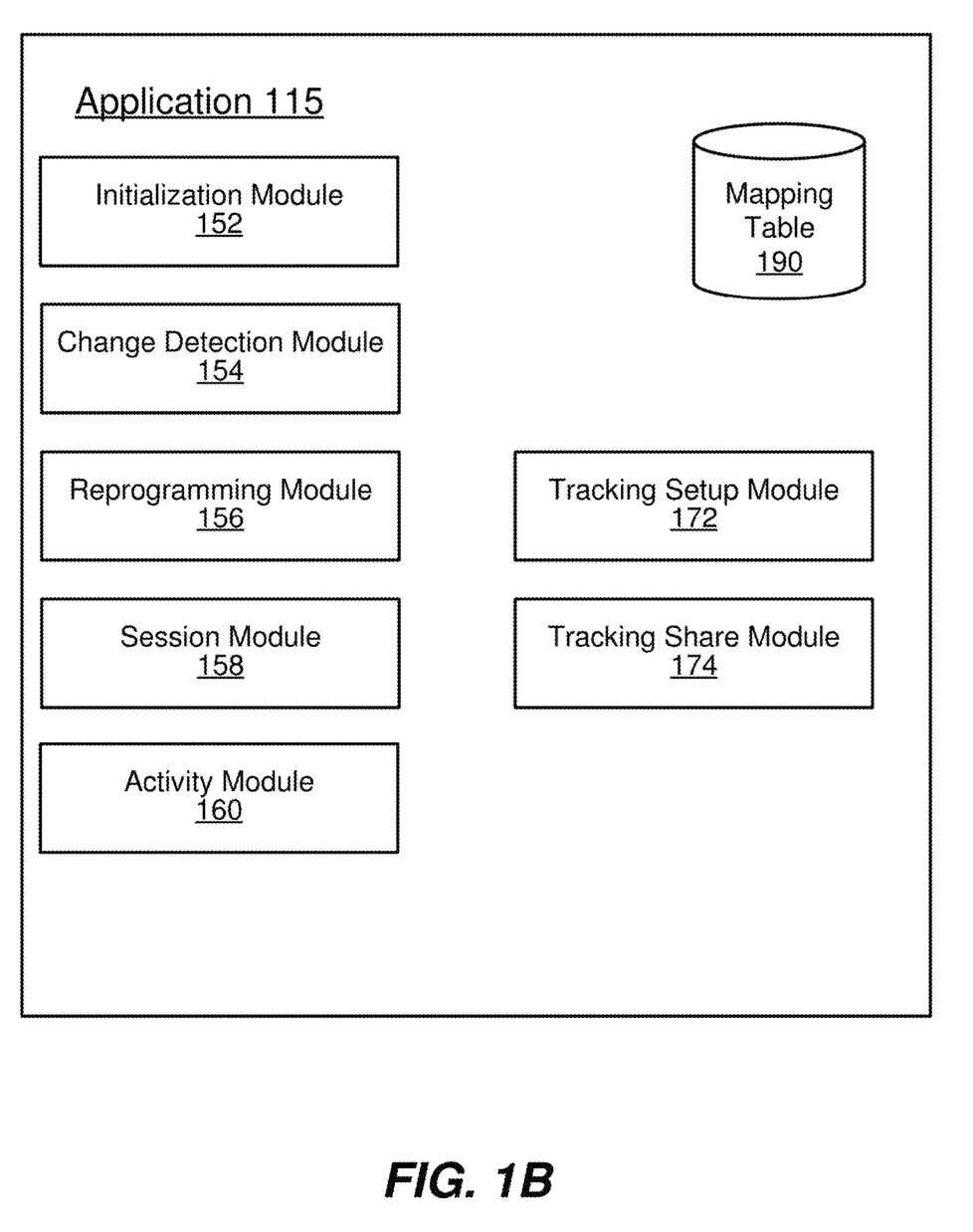
FIG. 1B illustrates exemplary modules and databases for operating an application of the rescue system.

FIG. 1B illustrates exemplary modules and databases for operating an application of the rescue system. As illustrated in FIG. 1B, application 115 includes initialization module 152, change detection module 154, reprogramming module 156, session module 158, activity module 160, tracking setup module 172, tracking share module 174, and mapping table 190. The modules and databases depicted with respect to application 115 are merely exemplary; fewer or additional modules and/or databases may be used to achieve the activity described herein. Moreover, the activities, modules, and databases described with respect to application 115 may be implemented, in whole or in part, by rescue system 140. That is, processing may occur entirely by rescue system 140 for activities described herein with respect to application 115, or may be distributed for partial processing by rescue system 140 and partial processing for application 115. References made with respect to application 115 that are not repeated for rescue system 140 even though rescue system 140 is enabled to perform that activity are omitted for brevity but are not to intended to limit the functionality to just being performed by application 115.

Initialization module 152 initializes an emergency contact services interface of application 115. Initialization module 152 may perform the initialization responsive to a triggering event. A triggering event may be a power-on of a client device on which application 115 is installed. A triggering event may be an enabling of a communications channel for the client device (e.g., an enabling of a cellular transceiver, an enabling of a wireless internet transceiver, a toggling off of airplane mode, and so on). A triggering event may include input by a user into a user interface of application 115 requesting initialization. A triggering event may include detection of initiation of an activity (e.g., as described below with respect to at least activity module 160). A triggering event may be any other event that causes initialization module 152 to initialize the emergency contact services interface. Following initialization, the emergency contact services interface is configured to, when selected or otherwise activated, open a communication session with a responder device of a rescue service.

Initialization module 152 may initialize the emergency contact services interface using sensor data obtained from one or more sensors of the client device on which application 115 is installed. The sensor data may inform location of the client device. For example, initialization module 152 may determine location of the client device using a Global Positioning System (GPS) sensor of the client device, information about a communications infrastructure component through which the user device is interfacing, using information in data packets received by the client device (e.g., location information of base stations and/or wireless internet devices indicated or otherwise derivable from the data packets), and so on. As another example, initialization module 152 may determine location of the client device referencing data generated by a camera sensor of the client device (e.g., a geotag on a picture taken by the client device within a threshold recency of a current time). The sensor data may also inform activity information of the client device (e.g., wetness sensor detects a water activity is performed; accelerometer data detects a motor vehicle is being used, etc.). Activity discussion is performed in more detail below with respect to activity module 160. Separately or together, the information derived from the sensor data is used by initialization module 152 to initialize the emergency contact services interface.

In an embodiment, initialization module 152 references mapping table 190 using the information derived from the sensor data. Mapping table 190 includes mappings of information derivable by sensor data of client devices to digital addresses of emergency rescue services. For example, different countries use different emergency services numbers. In the United States, that number is 911, but in the European Union, that number is 112. In an embodiment, mapping table 190 may map country emergency number information to those jurisdictions. In such an embodiment, initialization module 152 may initialize the emergency contact services interface to be associated with an emergency number for a jurisdiction reflected by the location information of the device. Jurisdiction may refer to country or to other areas that have dedicated emergency services numbers.

Mapping table 190 may be hierarchical. Exemplary hierarchies may include broad-to-narrow regional hierarchies. For example, a hierarchy may go from very broad (the European Union), to less broad (France), to narrower (an emergency number for Paris). Hierarchies may be organized against parameters that go beyond rote location parameters. For example, hierarchies may include emergency numbers for different departments within a region (e.g., in the city of Miami, Fla., a hierarchy may include an emergency number for the Miami police department, a different one for the Miami coast guard, a different one for the Miami fire department, and so on). A mapping table may map different sensor data and/or derivations from aggregate sensor data to different emergency numbers low in the hierarchy. For example, the mapping table may map a location over water (e.g., optionally, where cell phone signal strength is below a threshold minimum strength which indicates that a client device is far from land) to the Miami coast guard. The coast guard may be lowest in the hierarchy, next highest being the Miami police department, which would be attempted if the coast guard cannot be reached. Activity data may also be mapped to different agencies. Initialization module 152 may initialize the emergency contact services interface with logic to attempt a connection to a lowest emergency services provider in the hierarchy that matches the sensor data of the client device, followed by a next highest emergency services provider after each failed attempt, until an attempt is successful.

In an embodiment, to populate mapping table 190, rescue system 140 first determines a universe of jurisdiction, regions, sub-regions, and so on. Rescue system 140 then scrapes data from the Internet about rescue services that service each region. Rescue system 140 may apply logic to map the rescue services to different hierarchical structures. For example, logic may dictate that a region always maps to a police department for that region, but where the region has a coast guard, a lower-order hierarchical entry is provided for the coast guard as mapped to sensor data that indicates a water activity is performed (e.g., any combination of a GPS coordinate over the water, signal strength, wetness sensor, camera sensor data reflecting a water location, a wetness sensor embedded in a charger port indicating that the client device is wet, and so on).

In an embodiment, initialization module 152 need not reference a mapping table, and may instead act on-the-fly as the emergency services interface is activated. For example, initialization module 152 may, responsive to detecting that the emergency services interface is activated, determine location information of the client device, and access a third party database and/or scrape Internet resources to determine an emergency services number for that location.

Change detection module 154 determines, based on location data, whether the user device has entered a second jurisdiction. That is, similar to how initialization module 152 determines a jurisdiction for initializing the emergency services interface, change detection module 154 determines whether that initialized emergency services interface no longer is accurate relative to a new location of the user device. In an embodiment, change detection module 154 compares location data over time to mapping table 190, and responsive to determining that the mapping table points to a different emergency services destination address than the one currently initialized, change detection module 154 determines that the user device has entered a new jurisdiction.

Reprogramming module 156 reprograms, in response to determination of entry into the a new jurisdiction, the emergency contact services interface with an association to a destination address of an emergency services agency of the new jurisdiction. This is performed in the same manner described above with respect to initialization module 152, but for the new jurisdiction's associated destination address for an emergency services provider. That is, reprogramming module 156 replaces, in a data structure of the emergency contact services interface that maps the original jurisdiction's emergency service provider's destination address, the original one with the destination address for the new provider. The data structure thus includes a programmatic link to the second destination address that is executed responsive to detecting the selection of the emergency contact services interface to cause the data communication session to be established.

Responsive to detecting selection of the emergency contact services interface, session module 158 establishes a data communication session is established with the emergency services agency of the new jurisdiction (e.g., using the programmatic link). The data communication session may be any above-described network connection, and shares at least audio and auxiliary information with the emergency services agency of the new jurisdiction. The auxiliary information may include any information derivable from the client device, such as its location, image data, and so on.

Activity module 160 determines destination addresses for emergency services agencies that depend on an activity being performed by a user of the user device. For example, different activities may be associated with different rescue agencies. Specifically, land activities may be serviced by police, firemen, or paramedics, whereas water activities such as motorized or non-motorized boating activities may be serviced by coast guard agencies. Moreover, while some agencies have a centralized destination address through which the agencies can be contacted (e.g., police in any US municipality can be contacted using 911 in the United States), some agencies do not (e.g., coast guard agencies do not have a centralized contact number). Activity module 160 may determine what activity a user is performing (as described below with respect to FIG. 6), and may determine a particular destination address to contact responsive to selection of the "contact emergency services" button based on the activity as paired to known addresses of different emergency services of a given jurisdiction. In an embodiment, a data structure that maps activities to different destination addresses may be stored in a data base (e.g., mapping table 190), and rescue service 140 may reference the data structure to determine an address to contact. Where an activity-oriented rescue service is contacted, and the attempt to contact fails, rescue service 140 may go on to contact a general contact address. For example, in the United States, where an attempt to contact the Coast Guard fails, a second attempt may be made to contact 911. Rescue service 140 may reference a hierarchical structure of the data structure to determine an order in which to attempt to contact rescue services until an attempt is successful.

In an embodiment, activity module 160 may determine to contact a rescue service without a user selecting a "contact emergency services" button. For example, activity module 160 may determine based on tracked activity that a user likely needs emergency services. As one example, where a user is known to be cycling and abruptly stops (e.g., as detected using sensor data), activity module 160 may determine that an accident has likely occurred and may initiate activity that would otherwise be initiated responsive to a contact emergency services button being selected. As another example, where a sensor indicates a client device is immersed in water and the user is performing a boating activity, activity module 160 may instruct session module 158 to initiate a session with emergency services. Alternatively, activity module 160 may prompt a user (e.g., via a display or using audio and/or using haptics to obtain the user's attention) to confirm whether or not they require emergency services when such an event is detected, where a lack of response or a confirmation that emergency services are required may trigger emergency services. Any heuristic may be used to map an activity and detected sensor information to a need to contact emergency services.

In an embodiment, a user may wish to share their location information with another user so that the other user can keep track of where the user is while performing an activity. For example, if a user is going out on a jog at night in a dangerous neighborhood, or is going on a multi-hour kayaking adventure, the user may wish for another user to keep track of their location should something go wrong. There is no existing mechanism for, should something in fact go wrong, for the other user to share the location information with an emergency rescue services provider, and therefore in such a scenario where the other user connects with emergency rescue services on behalf of the sharing user, the other user may not be able to effectively convey the location. Moreover, the sharing user may be hesitant to share the location for privacy concerns about their location after the location is over, and therefore methods are disclosed herein for ensuring the sharing is ended when the activity is complete.

In an embodiment, tracking setup module 172 receives, using application 115 installed on a device of a tracking user responsible for tracking location of a sharing user, tracking data of a client device of the sharing user. The tracking data of the sharing user is received based on a request by the sharing user using application 115 to share the tracking data with the tracking user. In creating the request, the sharing user may interact with application 115 to share tracking information. In one embodiment, the user may enter the tracking user's contact information (e.g., phone number as depicted, or any other identifying information, such as email address, social media handle, handle for using application 115, and so on). In another embodiment, nearby devices may be surfaced to the user for selection (e.g., nearby devices within short range communication link range such as Bluetooth may have device identifiers surfaced), where a surfaced identifier may be selected. In an embodiment, multiple tracking users may be selected.

In an embodiment, parameters for sharing tracking information may be specified by the sharing user in creating the request to share. Where multiple tracking users are selected, different parameters may be selected for the different tracking users. As an example of parameter usage, where a person is going jogging at midnight somewhere dangerous and anticipate that they will be gone for 30 minutes, they may wish for their friend to see their location tracked for the anticipated period of absence. Therefore, the sharing user may input tracking should be shared for 30 minutes. Additionally or alternatively, the sharing user may indicate as a parameter to application 115 that should the person not return to their start location in the allotted time (or at all), tracking should be extended until the person returns to their start location.

In an embodiment, tracking may be activity based, where the sharing user specifies a parameter that when an activity is being performed (e.g., kayaking), location may be shared with the tracking user. Tracking setup module 172 may setup logic to integrate with activity module 160 to determine whether and when an activity is being performed, such that responsive to determining that an activity is being performed, tracking share module 174 begins sharing tracking information with the tracking user, and responsive to an end condition (e.g., a predicted time for performing the activity elapses and/or detecting an end of the activity based on information received from activity module 160), tracking share module 174 ends sharing tracking information with the tracking user.

The sharing user may indicate a parameter that the shared tracking information may be shared to a rescue agency should the person not return during the allocated time. For example, should a "contact emergency services" button be pressed by the friend, and sharing is still active based on other parameter settings, tracking share module 174 may enable sharing (e.g., in coordination with session module 158) by the tracking user of the location of the sharing user. Tracking share module 174 initiates sharing of the sharing user's location to the tracking user's application 115 responsive to detecting a sharing condition as described above, and terminates the sharing of the sharing user's location with the tracking user responsive to detecting a termination condition as described above.

Tracking share module 174 may prompt the tracking user (e.g., using a push notification or any other address information of the tracking user) responsive to sharing being initiated or terminating. Moreover, where activity module 160 of the sharing user's application detects an incident (e.g., an abrupt change during a bicycle ride indicative of a crash), tracking share module 174 may prompt the tracking user.

The tracking user may select the emergency contact services interface from their application 115, which responsively initiates a communications session with an emergency services agency, where the emergency contact services interface may be initialized and/or reprogrammed in any manner described herein. Should the parameters permit doing so, the tracking user may transmit location information of the sharing user to the emergency contact service provider during a session. Sharing may occur responsive to input by the tracking user into application 115 being detected to do so, or may occur automatically in connection with establishing the session between the tracking user and the emergency contact services interface. Tracking share module 174 may initiate the sharing accordingly. In an embodiment, the session may also include a request to the sharing user to join the session.

Figure 2:
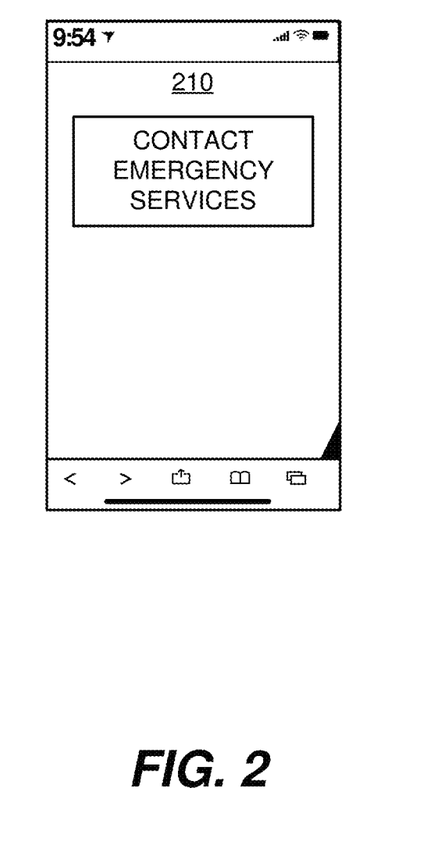

FIG. 2 illustrates an exemplary user interface for contacting emergency services regardless of what country a user is in. As depicted in FIG. 2, a "contact emergency services" selectable option 210 is displayed by application 115 on a user device. Responsive to detecting selection of the contact emergency services button, application 115 may determine a relevant emergency service organization (if not predetermined) and may initiate a communication with the emergency service organization. The communication may be a telephonic communication and/or a data communication (e.g., where information other than audio may be transmitted, such as medical information, location, and so on).

In an embodiment, the relevant emergency service is determined responsive to detecting that a user has entered a given country or jurisdiction or region, and/or based on activity, as described above. For example, the relevant emergency service may be initialized based on a country where a client device is located when application 115 is downloaded. Following initialization, application 115 may detect that the client device has entered a different country, and may responsively adjust a destination address (e.g., an emergency services contact address or phone number) to that corresponding to the respective country. For example, if a person travels from the United States to Germany, the person's client device may detect the change in location (e.g., using a location sensor of the device, using data obtained from a base station, gateway, or router through which the device is connecting, etc.), and that change in location may prompt a change in contact address that is associated with the "contact emergency services" button.

Figure 3:
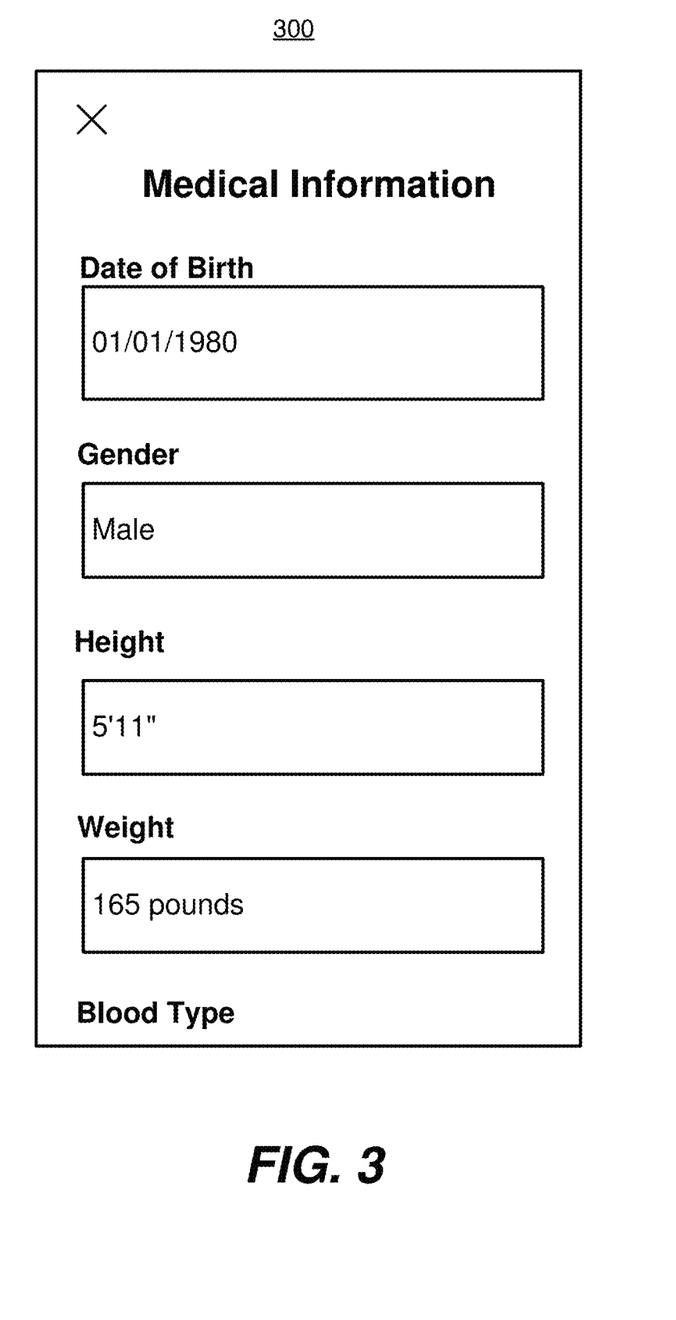
FIG. 3 illustrates an exemplary user interface for entering medical information.

FIG. 3 illustrates an exemplary user interface for entering medical information. Application 115 may accept voluntary entry by a user of medical information and any other information of the user by way of user interface 300. Application 115 may, when contacting rescue services, transmit a data communication with auxiliary information. The auxiliary information may include the medical information, location information, and any other sensor information. Application 115 may limit what sends in such scenarios to information that the user has opted in to sharing. Where a sharing user is sharing location with a tracking user, parameters set by the sharing user may include whether to share auxiliary information such as medical information along with location information by a tracking user to an emergency services provider. A given user may set parameters for sharing medical information in a session between their own client devices and an emergency services provider in the manner described above with respect to sharing users for setting parameters.

Figure 4:
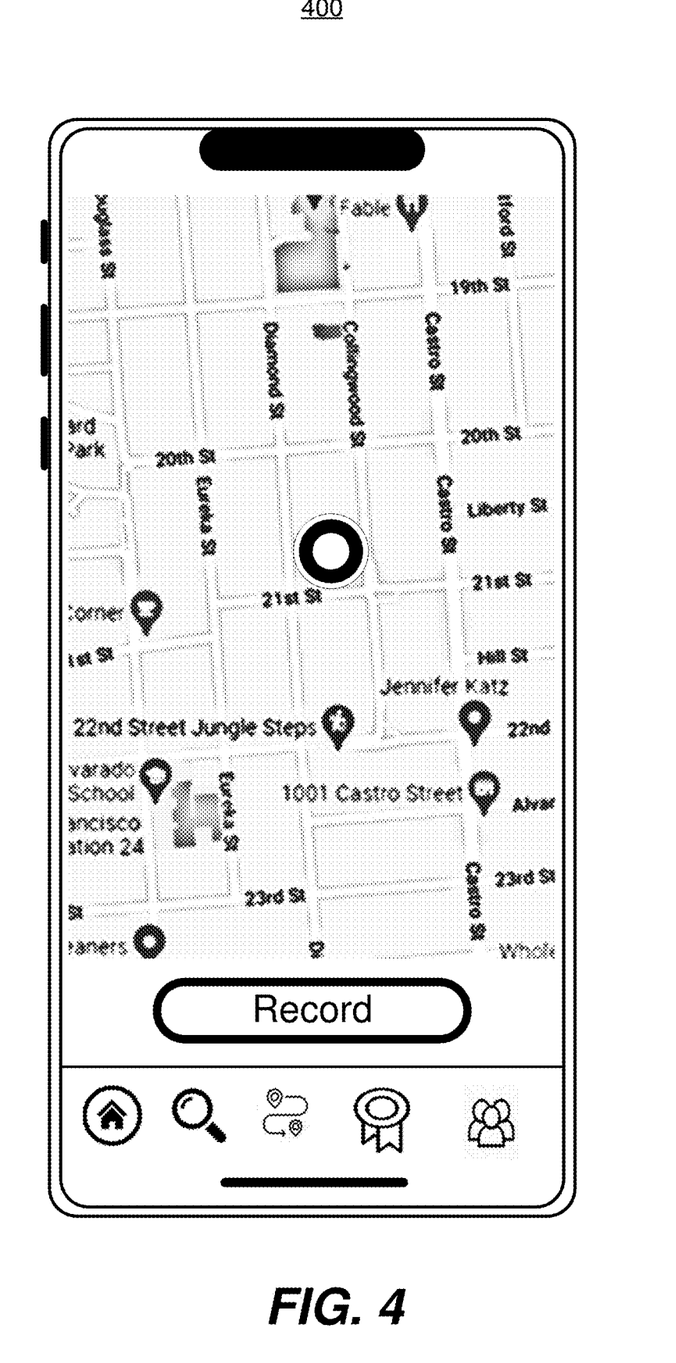
FIG. 4 illustrates an exemplary user interface for activating and de-activating a location tracking functionality.

FIG. 4 illustrates an exemplary user interface for activating and de-activating a location tracking functionality. A record selectable option 410 may be selected from user interface 400, which initiates the recording of data of one or more sensors of a user device. Where an activity of a user is known (e.g., as described below with respect to FIG. 6), recording of data may occur where sensor data reflects the activity is being performed, and may be paused where sensor data reflects that the activity is not being performed. For example, where cycling is selected, and speed is calculated based on sensor data to reflect a walking speed rather than a cycling speed, recording may be paused until the speed increases beyond a threshold.

Figure 5:
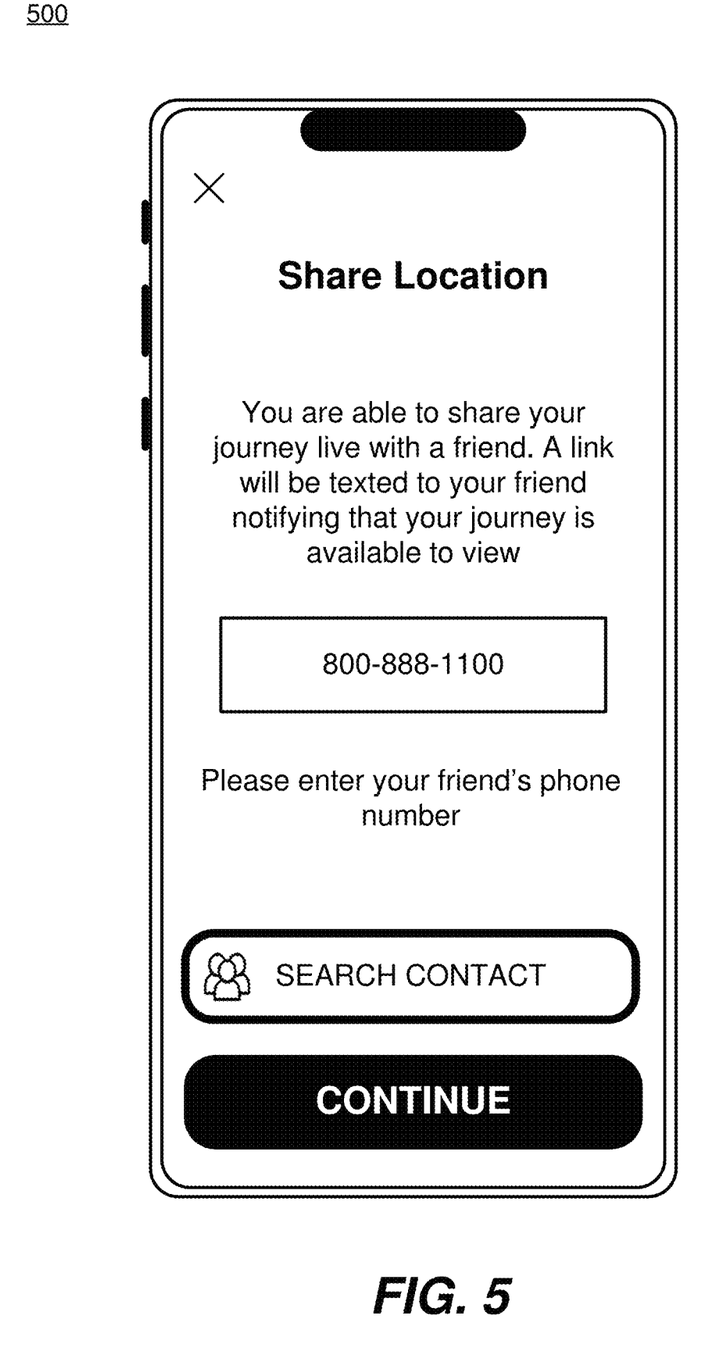
FIG. 5 is an exemplary user interface for sharing tracking information with another user.

FIG. 5 is an exemplary user interface for sharing tracking information with another user. As depicted in FIG. 5, a user may interact with user interface 500 of application 115 to share tracking information. In one embodiment, the user may enter another person's contact information (e.g., phone number as depicted, or any other identifying information, such as email address, social media handle, and so on). In another embodiment, nearby devices may be surfaced to the user for selection (e.g., nearby devices within short range communication link range such as Bluetooth may have device identifiers surfaced), where a surfaced identifier may be selected. Parameters for sharing tracking information may be specified within user interface 500 as well.

Figure 6:
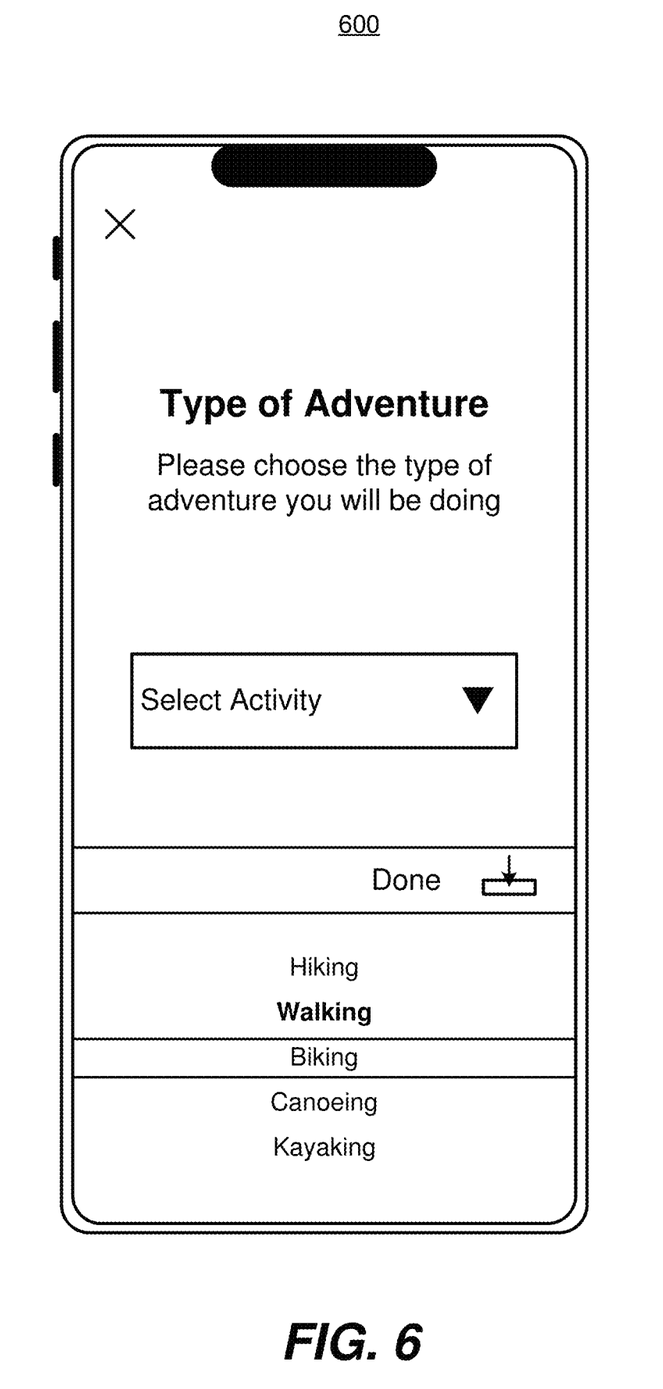
FIG. 6 is an exemplary user interface for selecting a type of activity a user in which a user will be engaged.

FIG. 6 is an exemplary user interface for selecting a type of activity a user in which a user will be engaged. As shown in FIG. 6, a user may select what activity they are engaging in. This may be used to determine, as described above, how to track the user, and whether to contact emergency services on the user's behalf. In an embodiment, rather than have the user expressly select an activity, application 115 may infer that the user is engaged in an activity based on sensor data collected from the user's client device. The input (or inference) may be managed by activity module 160.

Application 115 may be a standalone application, or may be a plug in to other applications. For example, a social media application, an accommodation booking application, or any other application may allow application 115 to plug in, thereby enabling a contact emergency services button within the context of another application to operate in the manner disclosed. The contact emergency services button may operate in an iframe of another application to ensure the integrity of the destination address cannot be tampered with. The term "contact emergency services button" is exemplary, and any other interface may be used, such as a selectable option and such as non-visual interfaces (e.g., a haptic command, such as a predefined sequence of shakes, or an audio command that is predefined, may result in emergency services being contacted).

In an embodiment, when location is shared (e.g., from a person in distress or from a tracking user of a sharing user with an emergency services provider), the location may appear in a map, and a tracking line feature may be used to provide a visual depiction of the sharing user's movement over time. The tracking line may predict future movement based on prior movement and/or environmental factors (e.g., current flow in a river in which a user is kayaking; weather patterns). A sharing user may end sharing of tracking information by selecting a selectable option from application 115 at any time while sharing is occurring.

Figure 7:
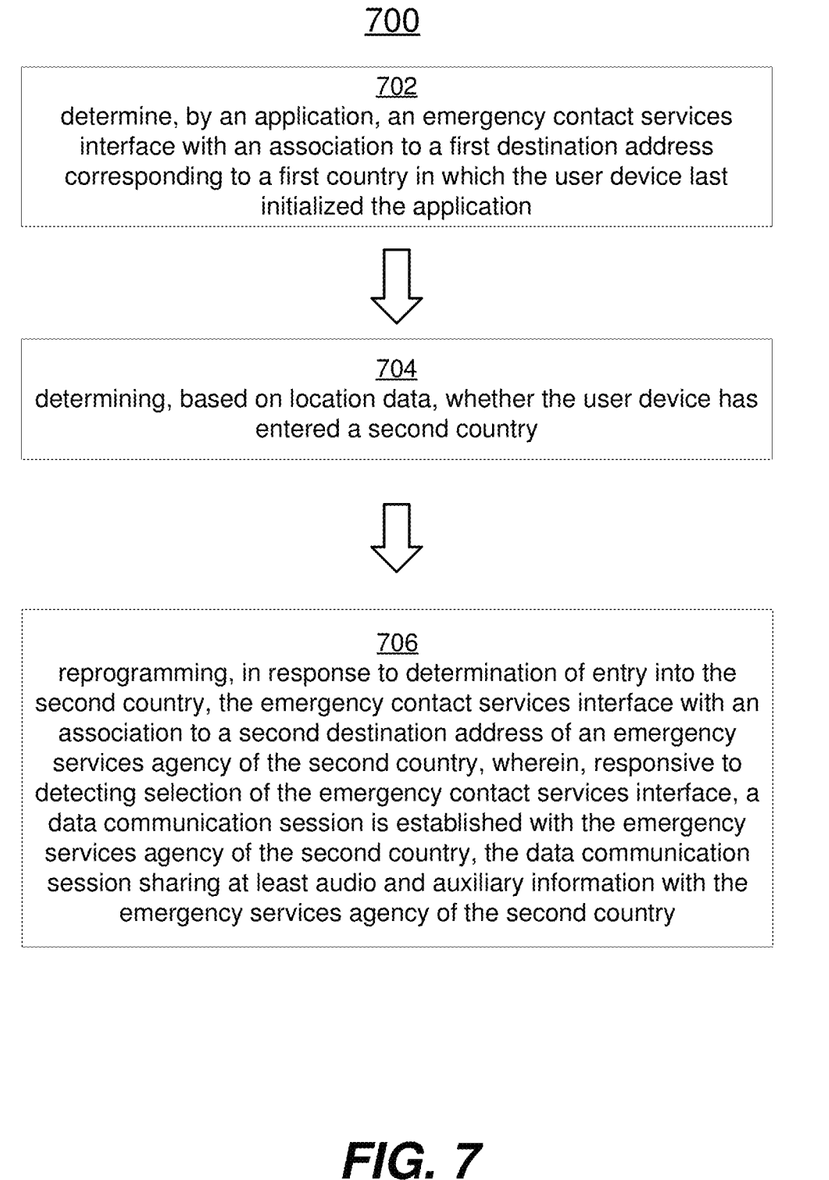
FIG. 7 is an exemplary flowchart illustrating a process for initiating a communications session with an emergency services agency, in accordance with an embodiment.

FIG. 7 is an exemplary flowchart illustrating a process for initiating a communications session with an emergency services agency, in accordance with an embodiment. Process 700 begins with application 115 and/or rescue system 140 (collectively referred to as application 115 throughout this flow diagram) determining 702 determining an emergency contact services interface with an association to a first destination address corresponding to a first country in which the user device last initialized the application (e.g., using initialization module 152). Application 115 determines 704, based on location data, whether the user device has entered a second country (e.g., using change detection module 154). Application 115 reprograms 706, in response to determination of entry into the second country, the emergency contact services interface with an association to a second destination address of an emergency services agency of the second country (e.g., using reprogramming module 156), where, responsive to detecting selection of the emergency contact services interface, a data communication session is established with the emergency services agency of the second country, the data communication session sharing at least audio and auxiliary information with the emergency services agency of the second country (e.g., using session module 158).

Figure 8:
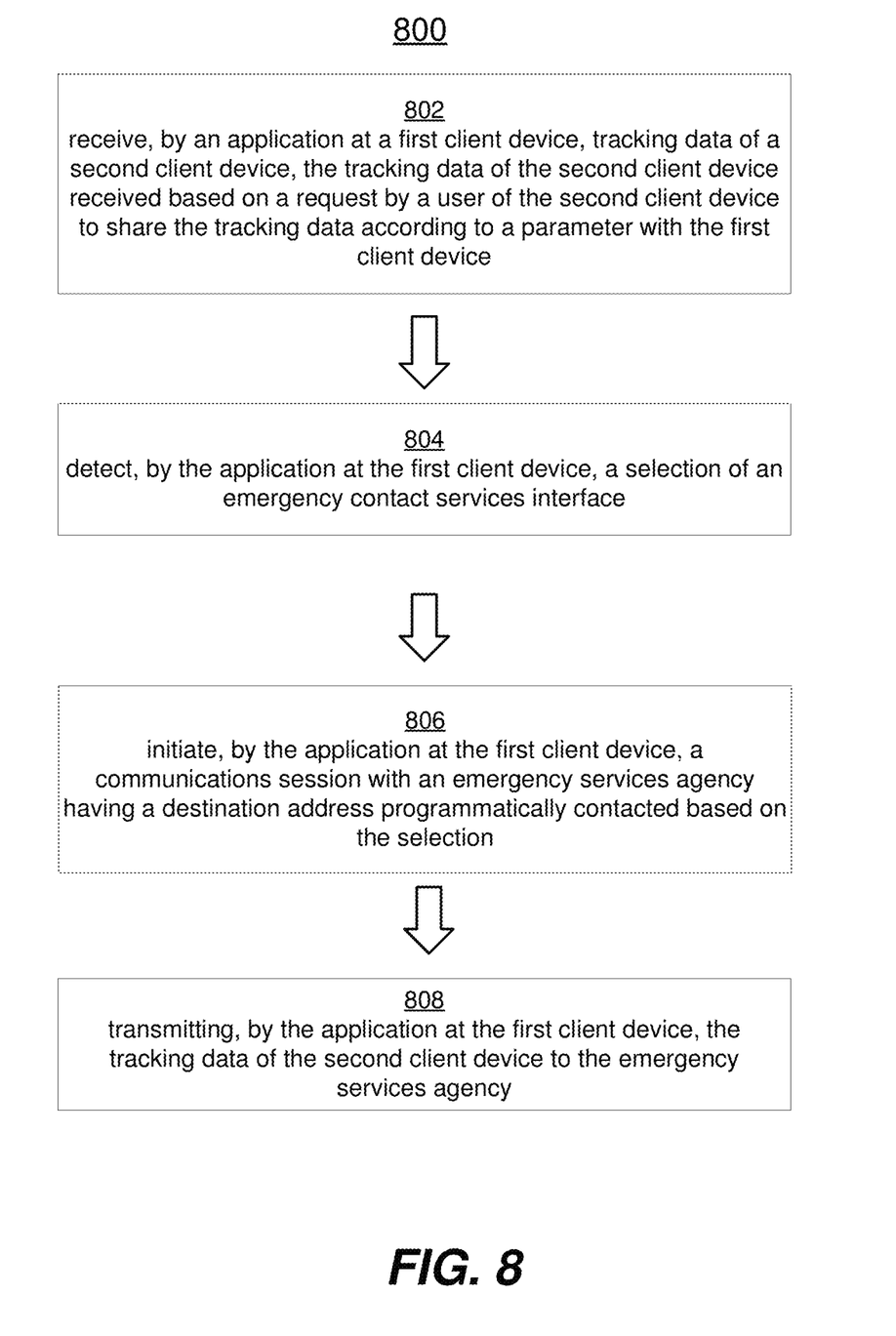
FIG. 8 is an exemplary flowchart illustrating a process for enabling sharing of tracking information of a first device by way of a second device, in accordance with an embodiment.

FIG. 8 is an exemplary flowchart illustrating a process for enabling sharing of tracking information of a first device by way of a second device, in accordance with an embodiment. Process 800 begins with application 115 and/or emergency rescue service 140 (collectively referred to as application 115) receiving 802, at a first client device (e.g., a tracking user), tracking data of a second client device (e.g., a sharing user), the tracking data of the second client device received based on a request by a user of the second client device to share the tracking data according to a parameter with the first client device (e.g., based on usage of tracking setup module 174).

Application 115 detects 804 a selection of an emergency contact services interface (e.g., initialized using initialization module 152 and/or reprogramming module 156). Application 115 initiates 806 a communications session with an emergency services agency having a destination address programmatically contacted based on the selection (e.g., using session module 158) and transmits 808 the tracking data of the second client device to the emergency services agency (e.g., using tracking share module 174).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for enabling rescue activities user through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for initiating a communications session with an emergency services agency, the method comprising:
determining, by an application installed on a user device, an emergency contact services interface with an association to a first destination address corresponding to a first country in which the user device last initialized the application;
determining, based on location data, whether the user device has entered a second country;
determining, using sensor data of the user device, an activity performed by a user of the user device in proximity to detecting a selection of the emergency contact services interface;
reprogramming, in response to determination of entry into the second country, the emergency contact services interface with an association to a second destination address of an emergency services agency of the second country, wherein the emergency services agency of the second country is selected based on the activity, and wherein, responsive to detecting the selection of the emergency contact services interface, a data communication session is established with the emergency services agency of the second country, the data communication session sharing at least audio and auxiliary information with the emergency services agency of the second country.

2. The method of claim 1, wherein the location data comprises location information for a communications infrastructure component through which the user device is interfacing.

3. The method of claim 1, wherein determining whether the user device has entered the second country occurs responsive to detecting, by the application, that the user device has transitioned a cellular transceiver of the user device from a disabled state to an enabled state.

4. The method of claim 1, wherein reprogramming the emergency contact services interface with an association to the second destination address comprises updating a data structure of the emergency contact services interface to replace the first destination address with the second destination address.

5. The method of claim 4, wherein the data structure comprises a programmatic link to the second destination address that is executed responsive to detecting the selection of the emergency contact services interface to cause the data communication session to be established.

6. The method of claim 1, wherein the second destination address is associated with a plurality of emergency service agencies of the second country, and wherein the emergency services agency is selected from the plurality of emergency service agencies based on a mapping table.

7. The method of claim 6, further comprising determining a region of the second country corresponding to the location data, wherein each of the plurality of emergency service agencies is associated with a different region of the second country, and wherein the mapping table maps each of the plurality of emergency service agencies to their respective region.

8. The method of claim 1, wherein the emergency services agency is selected by:
determining whether an activity-oriented rescue service is indicated on a mapping table;
responsive to determining that the activity-oriented rescue service is indicated on the mapping table, selecting the activity-oriented rescue service; and
responsive to determining that the activity-oriented rescue service is not indicated on the mapping table, selecting a rescue service mapped to a region indicated by the location data.

9. The method of claim 8, further comprising:
determining that an attempt to establish a data connection with the activity-oriented rescue service has failed; and
responsive to determining that the attempt to establish the data connection with the activity-oriented rescue service has failed, establishing the data connection with the rescue service.

10. The method of claim 1, wherein the selection of the emergency contact services interface is detected without explicit user selection based on detecting an abrupt change in the sensor data that is inconsistent with the activity.

11. A non-transitory computer-readable medium comprising memory with instructions encoded thereon for initiating a communications session with an emergency services agency, the instructions, when executed by one or more processors, causing the one or more processors to perform operations comprising:
   determining, by an application installed on a user device, an emergency contact services interface with an association to a first destination address corresponding to a first country in which the user device last initialized the application;
   determining, based on location data, whether the user device has entered a second country;
   determining, using sensor data of the user device, an activity performed by a user of the user device in proximity to detecting a selection of the emergency contact services interface;
   reprogramming, in response to determination of entry into the second country, the emergency contact services interface with an association to a second destination address of an emergency services agency of the second country, wherein the emergency services agency of the second country is selected based on the activity, and wherein, responsive to detecting the selection of the emergency contact services interface, a data communication session is established with the emergency services agency of the second country, the data communication session sharing at least audio and auxiliary information with the emergency services agency of the second country.

12. The non-transitory computer-readable medium of claim 11, wherein the location data comprises location information for a communications infrastructure component through which the user device is interfacing.

13. The non-transitory computer-readable medium of claim 11, wherein determining whether the user device has entered the second country occurs responsive to detecting, by the application, that the user device has transitioned a cellular transceiver of the user device from a disabled state to an enabled state.

14. The non-transitory computer-readable medium of claim 11, wherein reprogramming the emergency contact services interface with an association to the second destination address comprises updating a data structure of the emergency contact services interface to replace the first destination address with the second destination address.

15. The non-transitory computer-readable medium of claim 14, wherein the data structure comprises a programmatic link to the second destination address that is executed responsive to detecting the selection of the emergency contact services interface to cause the data communication session to be established.

16. The non-transitory computer-readable medium of claim 11, wherein the second destination address is associated with a plurality of emergency service agencies of the second country, and wherein the emergency services agency is selected from the plurality of emergency service agencies based on a mapping table.

17. The non-transitory computer-readable medium of claim 16, further comprising determining a region of the second country corresponding to the location data, wherein each of the plurality of emergency service agencies is associated with a different region of the second country, and wherein the mapping table maps each of the plurality of emergency service agencies to their respective region.

18. The non-transitory computer-readable medium of claim 11, wherein the emergency services agency is selected by:
   determining whether an activity-oriented rescue service is indicated on a mapping table;
   responsive to determining that the activity-oriented rescue service is indicated on the mapping table, selecting the activity-oriented rescue service; and
   responsive to determining that the activity-oriented rescue service is not indicated on the mapping table, selecting a rescue service mapped to a region indicated by the location data.

* * * * *

UNITED STATES PATENT AND TRADEMARK OFFICE
CERTIFICATE OF CORRECTION

PATENT NO. : 12,490,071 B2  
APPLICATION NO. : 18/109763  
DATED : December 2, 2025  
INVENTOR(S) : Paul Vickers Page 1 of 1

It is certified that error appears in the above-identified patent and that said Letters Patent is hereby corrected as shown below:

In the Claims

In Column 13, in Claim 1, Line 67, delete "interface:" and insert -- interface; --, therefor.

Signed and Sealed this  
Twenty-seventh Day of January, 2026

John A. Squires  
*Director of the United States Patent and Trademark Office*